March 20, 1956     C. E. OLSON     2,738,905
PASTE OR LIKE DISPENSER
Filed Nov. 10, 1950
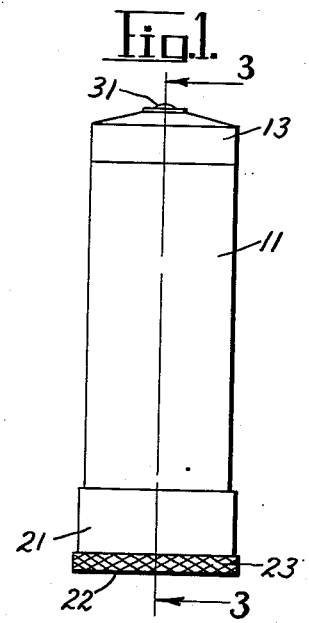
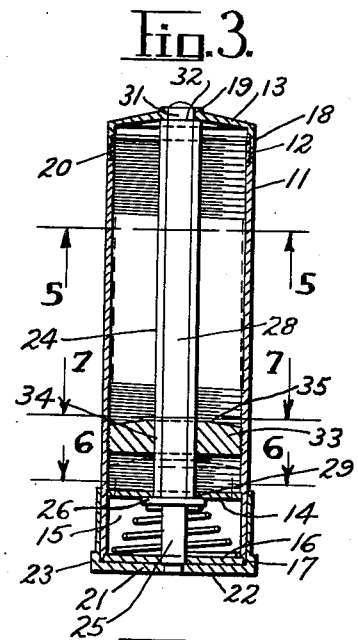
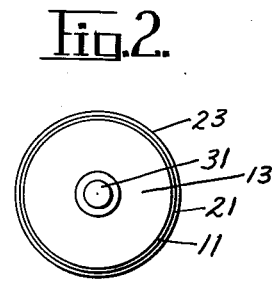
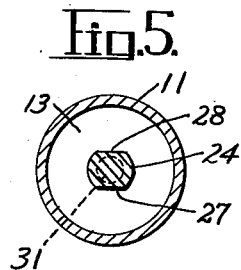
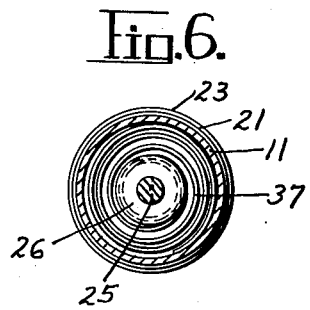
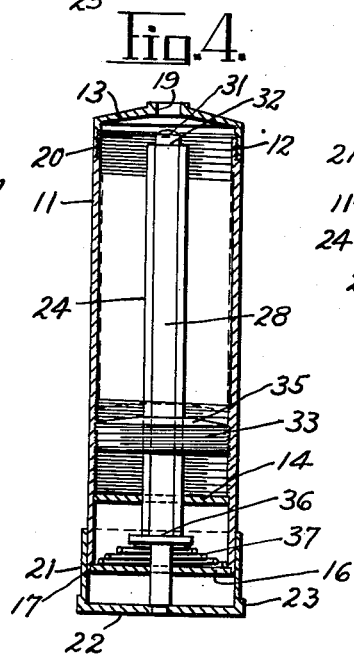
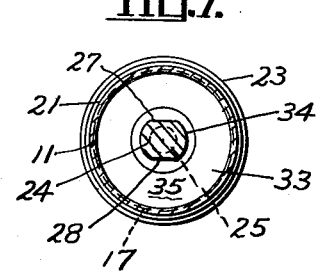
INVENTOR
*Carl E. Olson.*
BY
*Walter S. Edwards*
ATTORNEY

United States Patent Office 2,738,905
Patented Mar. 20, 1956

2,738,905

PASTE OR LIKE DISPENSER

Carl E. Olson, East Haven, Conn.

Application November 10, 1950, Serial No. 195,060

3 Claims. (Cl. 222—387)

This invention relates to paste, or like, dispensers, and more particularly to a dispenser for paste material, such as tooth paste, shaving cream and the like, and which has a non-collapsible casing in which the paste is disposed, and means to extrude a desired amount of paste from the casing.

One object of this invention is to provide a new and useful paste dispenser having in its structure the features and principles of this invention.

Another object is to provide in a paste dispenser a casing to receive and hold paste material, means to extrude paste therefrom through an opening in one end of the casing, and means to close and firmly seal the opening.

Still another object is to provide in a paste dispenser of the above nature, means to unseal the dispensing opening and to adjust the extruding means for dispensing a required amount of paste.

A still further object is to provide an improved paste dispenser which will be relatively simple in construction, readily assembled, inexpensive to manufacture, of pleasing appearance, and very efficient and durable in use.

With these and other objects in view, which will appear as the description proceeds, there has been illustrated in the accompanying drawings one form in which the features and principles of this invention may be practically embodied.

In the drawings:

Figure 1 is an elevational view of a paste dispenser embodying the features and principles of this invention;

Figure 2 is a top plan view of the same;

Figure 3 is a longitudinal sectional view taken on the line 3—3 of Figure 1;

Figure 4 is a longitudinal sectional view like Figure 3 but with the parts in another position;

Figure 5 is a cross-sectional view taken on the line 5—5 of Figure 3;

Figure 6 is a cross-sectional view taken on the line 6—6 of Figure 3; and

Figure 7 is a cross-sectional view taken on the line 7—7 of Figure 3.

Referring now to the drawings wherein like reference numerals designate like parts throughout the several views, the reference numeral 11 denotes a casing, preferably cylindrical in form and made of plastic material. The casing 11 is open at its upper end and is reduced in diameter as at 12 to receive a cover 13 telescopically, or threadingly, thereon. A disc-like plate 14 is inserted in, or is made integral with, the casing to close its bottom end. The plate 14 is spaced upwardly from the extreme bottom end of the casing 11 to provide a space 15 and thus forms, what will be termed, a false bottom for the casing. Another disc-like plate 16 is set into a counter-bore 17 in the extreme bottom end of the casing and is sealed therein by cement, or the like, if of plastic, or by solder, or the like, if the parts are metallic, when the dispenser is being assembled.

The cover 13, in this instance, is domed upwardly from a peripheral flange 18, which seats on the casing 11 and has a circular opening 19 in the center of its upper end. The cover 13 may be screw-threaded onto the casing, as shown at 20, or may be a tight press fit thereon. A cup-shaped cap 21, having a flat bottom surface 22, is provided to receive and freely rotate and slide on the lower end of the casing 11, and preferably has a knurled rim 23 about its lower end to facilitate grasping the same for manipulation to actuate the dispenser, as will be subsequently described. A shaft 24, secured at its lower end to the cap 21, extends upwardly through the bottom plate 16, the false bottom plate 14, the casing 11 and into the opening in the cover 13. The portion 25 of the shaft 24, between the plates 14 and 16 is reduced in diameter and has a washer 26 mounted thereon adjacent the plate 14. From the washer 26 the shaft has flattened sides 27 and 28 and is freely slidable through a correspondingly shaped hole 29 in the plate 14. The upper end 31 of the shaft 24 is reduced in diameter to freely slide in the opening 19 in the cover 13 and to provide an upwardly directed shoulder 32 to engage against the underside of the cover 13 about the opening 19 to assist in sealing the same.

The casing 11 is threaded on its interior surface substantially its entire length, from the false bottom plate 14 to its upper end. A circular follower 33, threaded on its periphery to adapt it to be screwed upwardly and downwardly in the casing 11, is provided with a hole 34 correspondingly shaped to freely slide on the shaft 24, on its flattened side portion 27, 28. In this instance the follower 33 is domed on its upper surface 35 to substantially fit the dome shape of the cover 13.

The washer 26 may be secured to the shaft portion 25, or be freely mounted thereon, as it rests against a downwardly directed shoulder 36 on the shaft 24 formed between the shaft portion 25 and the flattened side portion 27, 28. A coiled spring 37 is disposed in the space 15 to react between the washer 26, and also on the shaft 24 and the bottom plate 16, to constantly urge the shaft 24 and the cap 21 upwardly and thus cause the shaft end 31 to enter and close the opening 19, and the shoulder 32 to engage the underside of the cover 13 about the opening 19 to firmly seal said opening.

In use, the casing 11 of the paste dispenser of this invention is filled with the desired paste material, when the follower 33 is in its lowermost position, see dotted lines in Figure 3, through its upper end after removing the cover 13. The cover is now replaced and, due to the shaft end 31 being disposed in the opening 19 and the shoulder 32 engaging the cover 13, the paste filled casing 11 is completely, though releasably, sealed. When it is desired to extrude paste from the casing 11, the cap 21 is grasped and pulled downwardly against the action of the spring 37 whereupon the shaft end 31 and shoulder 32 is drawn downwardly from the opening 19 and from against the cover 13, respectively, to unseal the casing 11. The cap 21 is then given a rotary movement to rotate the shaft 24 which, through its flattened portion 27, 28, rotates the threaded follower 33 to move it upwardly, by cooperation with the threads on the interior of the casing, whereby the desired amount of paste will be extruded from the casing 11 through the opening 19 in the cover 13. The amount the follower 33 is raised when rotated by the cap 21 determines the amount of paste being extruded. When the cap 21 is released the spring 37 acts on the shaft to force its ends 31 gradually into the opening 19 and at the end of the stroke closes said opening and prevents further extrusion of the paste. When the follower 33 reaches and engages the cover 13 and its upward movement is stopped, it indicates that the casing is empty, and, if desired, may be refilled.

By the use of a paste dispenser embodying the features and principles of this invention no separable caps are present which may become lost, or improperly replaced on a tube, causing drying and hardening of the paste at the dispensing opening. The paste dispenser of this invention is efficient in use since only the amount of paste required is extruded from the same and, due to its smooth dispensing end, it can be readily cleaned of surplus paste. The flat bottom surface provided on the cap 21 permits storage of the dispenser in a vertical position. Since the casing 11 is made of relatively stiff non-collapsing material substantially all of the paste will be used. Due to the structure above described the dispenser of this invention is semi-automatic in its action since by the release of the cap 21 after setting the follower 33 in position to adjust the amount of paste desired and thus force the required amount of paste from the casing 11 through the hole 19 in the cover 13 the spring 37 acts to close and seal the opening 19.

While there has been shown and described herein a preferred form of the invention, it will be understood that the novel features and principles of this invention may be embodied in other specific forms without departing from the spirit and essential attributes thereof, and it is therefore desired that the present embodiment be considered in all respects as illustrative and not restrictive, reference being had to the claims rather than to the foregoing description to indicate the scope of the invention.

Having thus fully disclosed the invention, what is claimed as new and for which it is desired to secure Letters Patent, is:

1. In a dispenser, the combination of an elongated casing providing a reservoir for material to be dispensed therefrom and provided with a closure member at one end thereof, a removable cover at the other end thereof provided with a dispensing aperture, said casing having a false bottom spaced from said closure member, said casing having an internally threaded portion intermediate said false bottom and said cover, a slidable shaft extending through said closure member and said false bottom and having a reduced portion extensible through said aperture so as to be snugly received therein, said shaft having a shoulder at the inner end of said reduced portion and engageable with the inner face of said cover, said shaft being provided with an abutment intermediate said false bottom and said closure member, a coil spring compressed between said abutment and said closure member urging said shaft to the aperture-closing position thereof, a cap in fixed relation to said shaft and into which said one of the casing ends telescopes, and a follower on the shaft in slidable relation thereto and having threaded engagement with said internally threaded portion of the casing, said follower and said shaft being provided with cooperating means preventing rotation of the shaft relatively to the follower, said cap being manually rotatable to advance said follower toward the dispensing end of said casing to exert a selective pressure on the material to be dispensed located between the follower and said cover, said cap being manually slidable in a direction opposite said cover to withdraw the shaft with respect to said follower and said cover to an extent that the material in the casing may escape through said dispensing aperture under the selected pressure.

2. In a dispenser, the combination of an elongated casing providing a reservoir for materials to be dispensed therefrom and provided with a cover at one end thereof having a dispensing aperture formed therein, said casing being threaded interiorly throughout the greater part of the length thereof, a follower in the casing having threaded engagement with said threads formed in the casing, a longitudinally slidable shaft extending into said casing from the other end thereof and provided with a valve in longitudinally fixed relation to the shaft at the inner end thereof adapted to close said dispensing aperture, said shaft extending through said follower and being slidable with respect to the latter, said shaft and said follower being provided with cooperating means preventing rotation of the shaft relatively to the follower, and a manipulating member at said other end of the casing and in fixed relation to said shaft, said member being rotatable to advance said follower to an extent that a selective pressure may be exerted on the material to be dispensed, and said member being slidable in a direction away from said other end of the casing to retract the valve to an extent that the material in the casing may escape through said dispensing aperture under the selected pressure.

3. In a dispenser, the combination of an elongated casing providing a reservoir for material to be dispensed therefrom and provided with a cover at one end thereof having a dispensing aperture formed therein, said casing being threaded interiorly throughout the greater part of the length thereof, a follower in the casing having threaded engagement with said threads formed in the casing, a longitudinally slidable shaft extending into said casing from the other end thereof and provided with a valve in longitudinally fixed relation to the shaft at the inner end thereof adapted to close said dispensing aperture, said shaft being provided with an abutment intermediate the ends thereof, said follower being located on said shaft in slidable relation to the latter intermediate said abutment and said valve, said follower and said shaft being provided with cooperating means preventing rotation of the shaft relatively to the follower, resilient means connected to the casing and engaging said abutment on the shaft urging the shaft to the aperture-closing position thereof, and a manipulating member at said other end of the casing and in fixed relation to said shaft, said member being rotatable to advance said follower to an extent that a selective pressure may be exerted on the material to be dispensed, and said member being slidable in a direction away from said other end of the casing to retract the valve to an extent that the material in the casing may escape through said dispensing aperture under the selected pressure.

References Cited in the file of this patent

UNITED STATES PATENTS

| Re. 13,556 | Craven | Apr. 22, 1913 |
| 1,235,351 | McLaughlin | July 31, 1917 |
| 1,263,908 | Loeben | Apr. 23, 1918 |
| 1,609,479 | Loeben | Dec. 7, 1926 |
| 1,670,178 | Zearing et al. | May 15, 1928 |
| 1,756,811 | Brownsberger et al. | Apr. 29, 1930 |
| 2,506,833 | Hunter | May 9, 1950 |